United States Patent [19]

Klingenbeck-Regn et al.

[11] Patent Number: 5,293,044

[45] Date of Patent: Mar. 8, 1994

[54] METHOD FOR RAPID LOCALIZATION OF A SCINTILLATION EVENT IN A GAMMA CAMERA USING A MAXIMUM LIKELIHOOD ESTIMATOR

[75] Inventors: Klaus Klingenbeck-Regn, Nuernberg; Bernhard Conrad, Erlangen, both of Fed. Rep. of Germany

[73] Assignee: Siemens Aktiengesellschaft, Munich, Fed. Rep. of Germany

[21] Appl. No.: 940,682

[22] Filed: Sep. 4, 1992

[30] Foreign Application Priority Data

Sep. 11, 1991 [EP] European Pat. Off. ......... 91115370.8

[51] Int. Cl.$^5$ ............................................. G01T 1/17
[52] U.S. Cl. ............................. 250/369; 250/363.07; 250/366
[58] Field of Search .............. 250/369, 363.07, 363.09, 250/366; 364/414.24

[56] References Cited

U.S. PATENT DOCUMENTS

| | | | |
|---|---|---|---|
| 4,228,515 | 10/1980 | Genna et al. | 250/363.07 |
| 4,437,160 | 3/1984 | Blum | 250/369 |
| 4,654,795 | 3/1987 | Shimoni | 250/363.07 |
| 4,881,171 | 11/1989 | Jatteau et al. | |

FOREIGN PATENT DOCUMENTS

| | | | |
|---|---|---|---|
| 0155463 | 9/1985 | European Pat. Off. | |
| 0387800 | 9/1990 | European Pat. Off. | |
| 450388 | 10/1991 | European Pat. Off. | 250/369 |
| 55-33602 | 3/1980 | Japan | 250/369 |

OTHER PUBLICATIONS

Seeger, "A Fast Parallel Encoding Scheme for the Anger Camera", IEEE Transaction on Nuclear Science, vol. NS-31, No. 1, Feb. 1984, pp. 274-280.
"A Full-Field Modular Gamma Camera," Milster et al., J. Nucl. Med., vol. 31, No. 4, Apr. 1990, pp. 632-638.

*Primary Examiner*—Constantine Hannaher
*Assistant Examiner*—Edward J. Glick
*Attorney, Agent, or Firm*—Hill, Steadman & Simpson

[57] ABSTRACT

In a process for localizing a scintillation event in a gamma camera having a plurality of photomultipliers forming a camera surface, each photomultiplier generating an output signal in response to the scintillation event, wherein a plurality of comparative signal sets are generated from output signals of the photomultiplier corresponding to respective scintillation events of known location, a location-dependent probability function is formed based on a comparison of the outputs of the photomultipliers for a scintillation event of unknown location with the comparative signal sets, and the location of the scintillation event of unknown location is defined as the location corresponding to the maximum of the probability function, the speed with which the localization is accomplished is increased by initially defining a portion of the total gamma camera surface in which there is a high probability that the location of the scintillation event of unknown origin lies, and limiting the investigation for the location of the scintillation event of unknown location to that portion of the camera surface, with increasing precision.

13 Claims, 6 Drawing Sheets

METHOD FOR RAPID LOCALIZATION OF A SCINTILLATION EVENT IN A GAMMA CAMERA USING A MAXIMUM LIKELIHOOD ESTIMATOR

BACKGROUND OF THE INVENTION

1. Field of the Invention

The present invention relates to processes for the localization of a scintillation event in a gamma camera having a number of photomultipliers arranged over a camera surface, the output signals of which are compared with comparative signal sets which have been generated by comparative scintillation events with location-known origins thereby forming, a location-dependent probability function, with the location of the maximum of the probability function being registered as the location of the scintillation event.

2. Description of the Prior Art

Disintegration quanta of radioisotopes are traced in an examination object using a gamma camera. In such a gamma camera a scintillation crystal, usually consisting of sodium iodide (NaI(T1)) transforms the energy of the absorbed gamma quanta (typically 140 keV for $^{99}Tc$) into light. This scintillation light is distributed via a light guide, such as a glass plate of Pyrex ®, over a number of photomultipliers, the electric output signals of which are used for the determination of the absorption locus. In a conventional gamma or Anger camera a localization is undertaken according to the center of gravity principle. The absorption locus is obtained from the sum of the weighted individual signals of the photomultiplier divided by the sum of the signals of all the multipliers. The weighting factor is chosen dependent on the position of the corresponding photomultiplier relative to a coordinate origin on the camera surface. The division by the sum signal makes the localization as independent as possible from fluctuations in the light yield.

The localization according to the center-of-gravity principle is ordinarily realized with analog switching circuits, with the output signals of the photomultipliers being summed according to a weighing represented by resistances. Besides the resistive weighting processes are also known employing a capacitive weighting of the output signals. The sum signal, again, is formed by analog summing. The main disadvantage of this center-of-gravity localization is a correct determination of the absorption locus can be achieved only under certain conditions. For example, if in the border zones of the crystal the symmetry of the signal distribution is disturbed by light reflection on the crystal border, false localizations result. Moreover, for an absorption locus on the border the arrangement of the photomultipliers is weighted on one side toward the crystal interior, which leads to the result that the center-of-gravity localization in the border zone fails altogether. This is in part compensated in conventional gamma camera constructions, wherein the light guides and the photomultipliers overlap the crystal border. The consequence is that in the gamma camera with analog center-of-gravity localization there remains a border not usable for the image generation which, according to experience, has the extent of about 1.5 times the radius of a photomultiplier.

A process which, despite such border effects, permits a localization is described in an article by Milster et al.: "A Full Field Modular Gamma Camera" in the Journal of Nuclear Medicine, Vol. 31, No. 4, 1990, pp. 632-639. By digitization of the output signals of the photomultipliers directly after a pre-amplification, digital and non-linear localization processes can be used. These processes make it possible to extend the localization directly to the crystal border and thus present possibilities for a modular construction of virtually arbitrary camera geometries.

In digital localization processes, the use of a probability function or a maximum likelihood estimator has proven useful; other processes such minimum average square error have been used with virtually equivalent results.

From the aforementioned Milster et al. article, it is known to employ a maximum likelihood estimator process on the basis of the Poisson model for statistical fluctuations of the output signals of the photomultipliers. For each possible combination of the output signals the most probable locus is entered in a memory in the form of a look-up table. Each position in the look-up table is additionally marked as to whether the value of the likelihood function falls into a certain likelihood window. This known realization of the maximum likelihood estimator process has the advantage that by means of the look-up table the localization can occur very speedily. The disadvantage is that because of the memory capacity requirement for the look-up table, the application is restricted to camera modules with few photomultipliers and a low bit-depth for the corresponding signals. For example, for a camera or measuring surface of $10 \times 10$ $cm^2$ with four photomultipliers and a 5-bit representation of the output signals of the photomultipliers, a memory of 2 megabytes is required for the lock-up table. Only slight extensions of the above parameters lead to drastically higher storage requirements. Thus, for 4 photomultipliers with an 8-bit digitalization, 8 gigabytes are needed, while for 8 photomultipliers with a 5-bit digitialization, 2048 gigabytes are required. For still larger modules and/or higher accuracy of the quantization, the storage requirement increases into the immeasurable range.

SUMMARY OF THE INVENTION

It is an object of the present invention to provide a process for use in a gamma camera with which a rapid localization of a scintillation event is possible using the probability function with high localization accuracy also with large camera surfaces and a large number of photomultipliers.

The above object is achieved in a first version of a process in accordance with the principles of the present invention wherein a rough initial pre-localization of a partial camera surface is predetermined in which with high probability the locus is determined to reside. With this process the localization using the probability function is restricted to a zone in which with high probability the scintillation event lies. This localization process is independent of the size of the camera surface and the number of photomultipliers. In this way, a rapid localization with high accuracy can be achieved even with large camera surfaces.

In an advantageous embodiment of the first version of the process, the partial camera surface comprises at least the observation surface (area) of the photomultiplier which produces the largest output signal. A rough pre-localization is thereby simply and rapidly realized.

In a preferred embodiment of the first version of the process, in a first step in this partial camera surface is determined in a crude raster and then in a second step a second smaller partial camera surface is superimposed around the raster point with the highest value of the probability function, in which, in a finer raster, the probability function is again determined. With this process the number of the values to be determined for the probability function is further reduced and the localization becomes faster, without degrading the localization accuracy.

The above object is also achieved in a second version of the process wherein the camera surface is subdivided into overlapping partial surfaces, within each partial surface the probability function is determined for one point, and the partial surface in which the probability function has the greatest value is further subdivided into overlapping further partial surfaces. This further subdivision is stopped when the side length of the further partial areas (surfaces) reaches the spacing of the comparative scintillation events. The surfaces to be investigated are thus very rapidly reduced because only that surface is further considered which contains the maximal value of the probability function. With this second version of the localization process, a rapid localization with high localization accuracy with large camera surfaces and a large number of photomultipliers can also be achieved.

In a preferred embodiment the second version of the process, the side lengths of a partial surface arise from the sides of the camera surface, or a larger partial surface by division according to the golden section. This localization process is optimal in the sense that it finds the maximum with the greatest certainty.

For calculating the probability function in both the two versions of the localization process, a comparative signal set is generated from the average values of the photomultiplier output signals caused by a comparative scintillation event of known origin (location). The probability of an output signal is calculated in each case from the average value and from the output signal over a distribution function. The probability function is calculated in each case from the probabilities for the output signals of all the photomultipliers. The on-line calculation of the probability function makes possible a localization without a large storage capacity requirement.

An improvement of the accuracy and a more rapid localization can be achieved in a further embodiment of both versions of the localization process wherein each comparative signal set comprises the standard deviations of the output signals of the comparative scintillation and that the distributioin function is a Gaussian distribution function. With a Poisson distribution, the standard deviation is determined, except for the Fano factor, from the square root of the average value. This relationship holds, however, only under idealized conditions which are not present in actual practice, such as equal photocathode sensitivity and equal amplification of the photomultipliers. The Gaussian distribution, in contrast to the Poisson model, is a two-parameter distribution. The inequalities can be taken into account essentially by the second parameter, so that the absorption locus can be more accurately determined. The more rapid localization with use of the Gaussian distribution is due to the fact that, in contrast to the Poisson distribution, in the calculation of the likelihood function no time-consuming calculation of permutations is required.

Both process versions have in common the feature that the probability function is not determined for the totality of the camera surface, but instead after a certain search strategy, the probability function is determined only in a partial camera surface.

DESCRIPTION OF THE PREFERRED EMBODIMENTS

Figure 1:
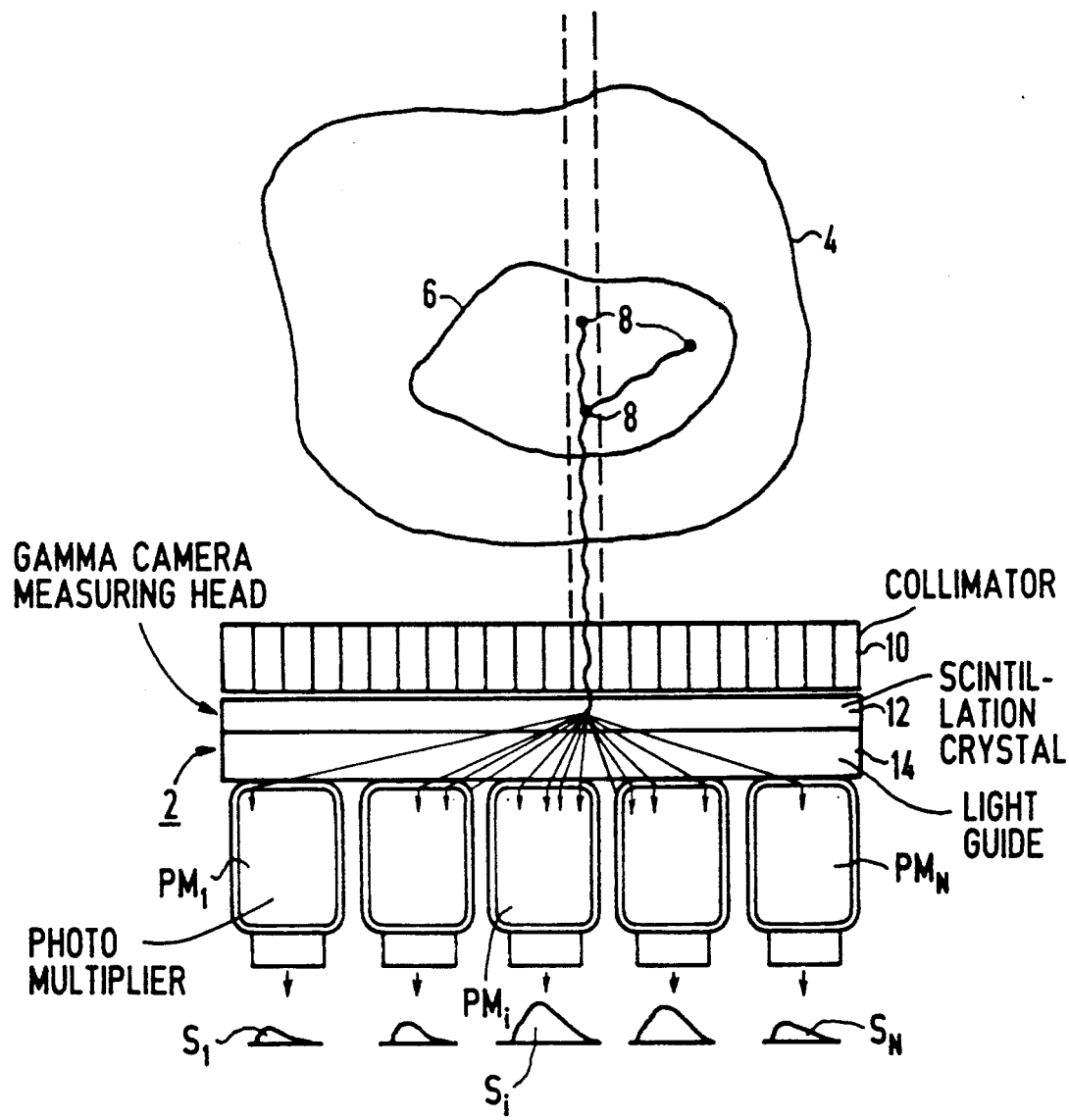
FIG. 1 shows schematically the construction of the measuring head of a typical gamma camera.
Figure 2:
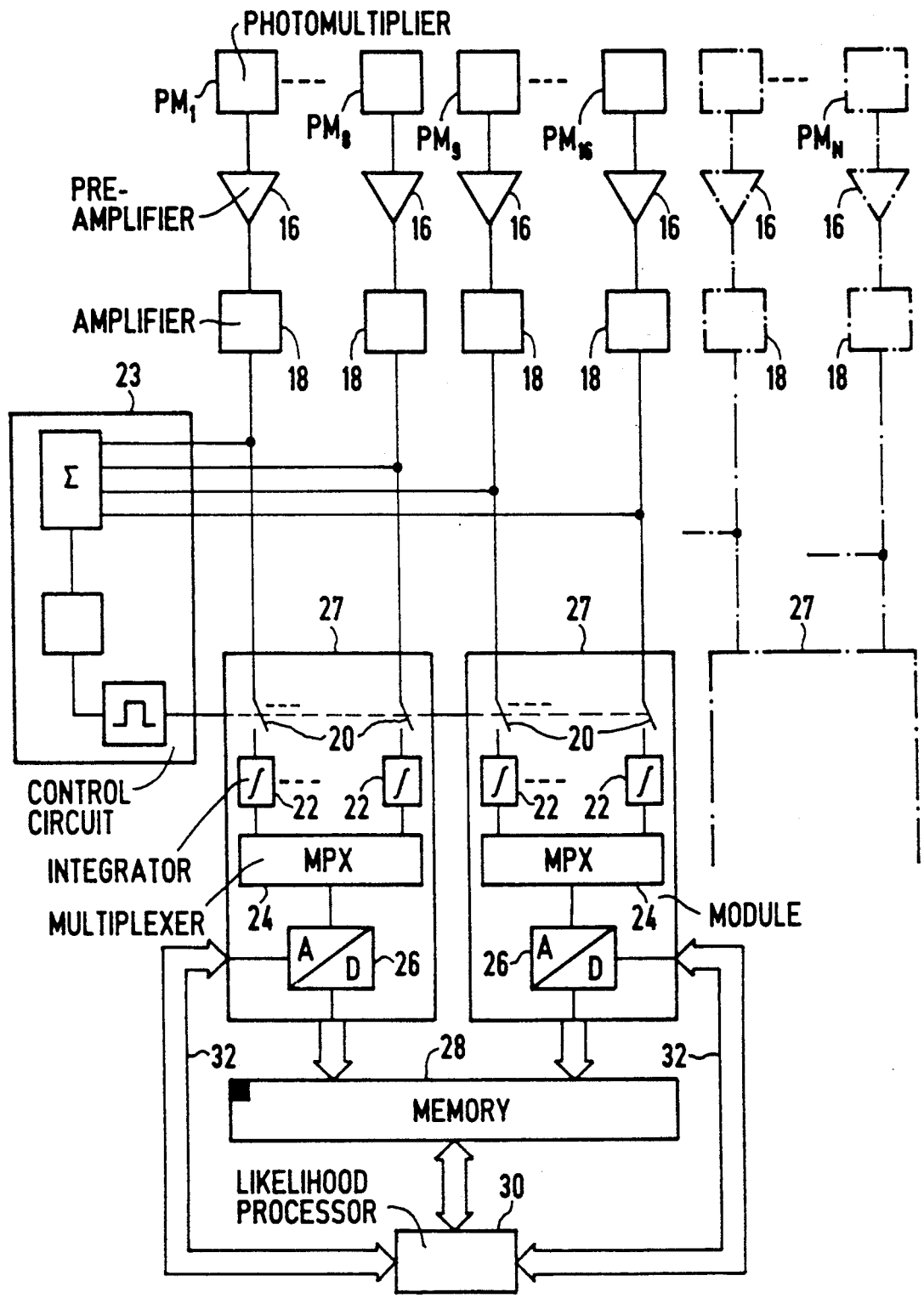
FIG. 2 is a block circuit diagram of a digital gamma camera operating in accordance with the principles of the present invention.

A schematically represented measuring head 2 of a gamma camera is shown in FIG. 1, aligned with an investigation object 4, in which an investigated zone 6 is present, enriched with radio isotopes, for example $^{99}$Tc. FIG. 2 shows points 8 which indicate, as an example, the locus of the gamma quanta arising in the disintegration of the radioisotopes. The disintegration quanta are guided through a collimator 10 onto a scintillation crystal 12, which in most cases consists of sodium iodide (NaI).

In the scintillation crystal 12 the energy (typically 140 KeV for $^{99}$Tc) of an absorbed gamma quantum is transformed into light. This scintillation light is distributed via a light guide 14, which consists, for example, of a glass plate of Pyrex ® glass, over a number of photomultipliers $PM_1$ to $PM_N$. The corresponding electric output signals $S_1$ to $S_N$ of the photomultipliers $PM_1$ to $PM_N$ are used for the determination of the absorption location or of the origin (location) of the scintillation event, The camera surface in which the gamma quanta are absorbed and localized is defined essentially by the surface of the scintillation crystal 12. It should be noted that for the localization process described herein, in contrast to a camera making use of an analog center-of-gravity localization, the light conductor 14 and the photomultipliers $PM_1$ to $PM_N$ do not extend over the boundary of the scintillation crystal 12. This permits a modular construction of virtually arbitrary gamma camera geometries.

The evaluation of the signals $S_1$ to $S_N$ from the photomultipliers $PM_1$ to $PM_N$, for the localization event is explained with the aid of the block circuit diagram in FIG. 2. Each photomultiplier $PM_1$ to $PM_N$ is connected through a preamplifier 16, to a primary amplifier 18 (which can be omitted), which is connected through a switch 20 to an integrator 22. The outputs of the main amplifiers 18 are likewise connected in a known manner to a control circuit 23. This control circuit 23 forms from the output signals $S_1$ to $S_N$ of the photomultipliers $PM_1$ to $PM_N$, a sum signal or energy signal, which is fed to a comparator. The comparator establishes whether the sum signal lies in a range that is characteristic for the event to be localized. The comparator then generates a pulse of typically 0.2 to 2 μs, which switches on the switch 22 to an "on", or conducting state for the pulse duration. During this time the output signals $S_1$ to $S_N$ are fed to analog-digital converters 26. The pulse-form output signals $S_1$ to $S_N$ of the photomultipliers $PM_1$ to $PM_N$ are integrated in order to reduce statistical variations in the pulse amplitude. In each case eight photomultipliers $PM_1$ to $PM_8$, $PM_9$ to $PM_{16}$ etc. are connected through a multiplexer 24 to an analog-digital converter 26.

Each analog-digital converter 26 and multiplexer 24 connected thereto and the associated integrators 22 and switches 20 form a module 27. In FIG. 2, two modules 27 are shown, but further modules 27 and also further photomultipliers can be provided in the gamma camera, as indicated by the dashed lines.

Instead of one analog-digital converter 26 in common in each case for eight photomultipliers, each photomultiplier can be allocated an analog-digital converter of its own. The multiplexers 24 are then omitted.

The integrated and digitized output signals are stored in a memory 28, in order to determine the location of the scintillation event. For this purpose, the memory 28 is connected by a data bus 29 to a likelihood processor 30, which communicates with the analog-digital converters 26 in the modules via a further data bus 32.

The general steps in a typical digital localization process using a maximum likelihood estimator are described immediately below.

An event, such as the absorption quantum at an unknown location, is defined by a vector $(S_1, \ldots, S_N)$ the components of which are the output signals $S_i$ of the individual photomultipliers $PM_i$, in which $i = 1, \ldots, N$. The vector $(S_1, \ldots, S_N)$ is designated in the following as a pattern and is present in digital form per event in the memory 28.

For a class of events, for example, primary gamma quanta, there are known signal vectors $(\bar{S}_1(x,y), \ldots, \bar{S}_N(x,y))$ at loci x, y arranged in a raster on the camera surface. Such signal vectors as well as signal patterns can be measured, for example, by scanning the measuring surface of the camera with a collimated gamma source at the discrete points x, y. Comparative scintillation events with locus-known origins are thereby generated. By averaging over many events at a scanning point $x_k$, $y_l$, the signals $\bar{S}_1(x_k, y_l), \ldots, \bar{S}_N(x_k, y_l)$.

The unknown absorption locus for an event $S_1$ to $S_N$ is determined by calculating the similarity of the measured pattern with the comparative signal. The location x, y, for which maximal similarity arises, is identified with the absorption place. The formal quantification of the similarity occurs with the locus-dependent likelihood function L(x,y), defined further below.

By use of a threshold value which the maximum of the likelihood function L(x,y) must exceed (likelihood threshold), or a likelihood window within which the maximum must lie, it is possible to suppress events which do not belong to the class of events from which the signal patterns were determined.

The quantitative formulation of the maximum-likelihood estimator process requires the definition of the likelihood function, which is based on the theoretical description of the statistics of the output signals $S_1$ to $S_N$. If $\bar{S}_i(x,y)$ signifies the average signal of the photomultiplier $PM_i$ for the absorption of a gamma quantum at the location x, y, then $P_i(\bar{S}_i(x, y), S_i)$ is the probability that the photomultiplier $PM_i$ will generate a signal $S_i$ deviating from the average signal $\bar{S}_i$. In good approximation this probability $P_i(\bar{S}_i(x,y), S_i)$ can be modeled as a Poisson distribution:

$$P_i(\bar{S}_i(x, y), S_i) = \frac{(\bar{S}_i(x, y))^{S_i}}{S_i!} \exp(-\bar{S}_i(x, y)). \quad (1)$$

The locus-dependent likelihood function (L(x, y) is defined as the product of these individual probabilities:

$$L(x, y) = \prod_{i=1}^{N} P_i(\bar{S}_i(x, y), S_i) \quad (2)$$

and gives the probability that an event at the locus (x,y) will yield the signal vector $(S_1, \ldots, S_N)$ when the average signal vector is given by $(\bar{S}_1(x,y), \ldots, \bar{S}_N(x,y))$.

For an unknown event $S_1$ to $S_N$, therefore, the localization technique is to determine the maximum of L(x,y) over all loci x, y.

For the numerical evaluation of the likelihood function it is advantageous to logarithmize:

$$LL(x, y) = \ln L(x, y) = \sum_{i=1}^{N} \ln P_i(\bar{S}_i(x, y), S_i). \quad (3)$$

With the individual probabilities from equation 1 there is obtained:

$$\ln L(x, y) = \sum_{i=1}^{N} (S_i \ln \bar{S}_i(x, y) - \bar{S}_i(x, y) - \ln(S_i!)). \quad (4)$$

This form of the maximum-likelihood estimator is unfavorable, however, when the terms in $(S_i!)$ cannot be read out of a look-up table, but must be numerically calculated in each case. Since the terms in $(S_i!)$, however, depend on the actual signal vector, they are absolutely required for a determination of the value of the likelihood function L for threshold or window.

A more favorable form of the maximum-likelihood estimator is obtained for the respective numerical calculation if the Poisson distribution of equation 1 is replaced by a Gaussian distribution in accordance with the invention:

$$P_i(\bar{S}_i(x, y), S_i) = \quad (5)$$

$$\frac{1}{\sqrt{2\pi} \; \sigma_i(x, y)} \exp(-(\bar{S}_i(x, y) - S_i)^2 / 2\sigma_i^2(x, y)).$$

in which $\sigma_i(x,y)$ designates the standard deviation of an event from the average events at the locus x, y for the photomultiplier $PM_i$. In contrast to the Poisson model, the Gaussian model is a two-parameter distribution with $\bar{S}_i(x,y)$ and $\sigma_i(x,y)$, so that a more accurate determination of the absorption locus is possible. The standard devoation of the Poisson distribution, proportional to the square root of the average value, holds only under idealized conditions, which are not present in actual practice, such as equal photocathode sensitivity and equal amplification of the photomultipliers. Measures and investigations show that the maximum-likelihood localization with use of the Gaussian model is about 5% more accurate than the Poisson model.

A further advantage lies in the numerical determination of the logarithmized likelihood function (LL(x,y), which now reads:

$$\ln L(x, y) = -\sum_{i=1}^{N} \ln(\sqrt{2\pi}\ \sigma_1(x, y)) + \frac{(S_i - \bar{S}_i(x, y))^2}{2\sigma_i^2(x, y)}. \quad (6)$$

As compared to equation 4, in equation 6 there the time-consuming calculation of permutations is eliminated. The value of the logarithmized likelihood function (LL(x,y) can be rapidly determined numerically on the basis of the Gaussian model.

In the known realization of the maximum-likelihood estimator process on the basis of the Poisson model, for each possible signal vector $(S_1 \ldots, S_N)$ the most probable locus according to equation 4 is stored in the form of a look-up table. This realization of the maximum-likelihood estimator process has the advantage that by means of the look-up table the localization can occur very rapidly. Because of the storage capacity requirement for the look-up table, however, its use is restricted to camera models with few photomultipliers and little bit depth for the corresponding signals.

The large memory needed in the case of larger camera surfaces with a high number of photomultipliers is considerably reduced when the probability function used for the localization is calculated on-line in each case for each absorbed gamma quantum. As already mentioned, for this the Gaussian distribution function is especially favorable, since the calculation-intensive terms of the Poisson statistics are avoided. All the magnitudes in equation 6 that relate to average patterns, i.e., $\bar{S}_i(x,y)$ and $\sigma_i(x,y)$ or in $\sigma_i(x,y)$ can be calculated in advance according to a calibrating scan with a collimated gamma source and stored. The storage required for this is low, as the two following examples show.

In a first example there is taken as starting point a module surface of 20×20 cm 2 with a 4×4 array of photomultipliers. In the case of a raster of the comparative scintillation events with $\Delta x = \Delta y = 2$ mm there are obtained 10,000 comparison points. If the comparative signal set is quantized with 16 bits, then for the 16 photomultipliers $PM_1$ to $PM_{16}$ there are required, per raster point for the average values $\bar{S}_i$, 16×2 bytes and for standard deviations $\sigma_i$ likewise 16×2 bytes of storage. The complete pattern table for all the comparison points requires 640 kbytes of storage space.

In a second example there is taken as starting point a module surface of 30×30 cm² with a 6×6 array of photomultipliers. Analogously to the first example there are yielded 22,000 points of comparison and from these a storage capacity requirement of about 1.4 Mbytes.

To localize the scintillation events in the on-line calculation of the likelihood or logarithmized likelihood function, sufficiently rapidly, a strategy is described below that minimizes the number of calculations of the likelihood L(x,y) or of the logarithmized likelihood function LL(x,y) on the given raster. Without any such strategy, the localization of a single quantum requires the calculation of the probability function L(x,y) or LL(x,y) at each raster point and additionally requires finding the maximum of this function. For the first example a computing time of about 1-2 seconds per event is needed if a general work station without specialized hardware is used.

By pinpointed localization or search strategies, with equal accuracy in the localization, the computing times can be reduced by several powers of ten. All these strategies have in common the feature that the probability function is no longer calculated at all comparison points. In the first strategy a rough pre-localization is undertaken to identify a range, within which the localization using over the probability function is then applied for the more accurate determination of the absorption locus. In the second strategy the search process—possibly combined with interpolations—in each partial step already excludes relatively large partial surfaces of the camera in which there is a low likelihood the maximum of the probability function lies.

Figure 3:
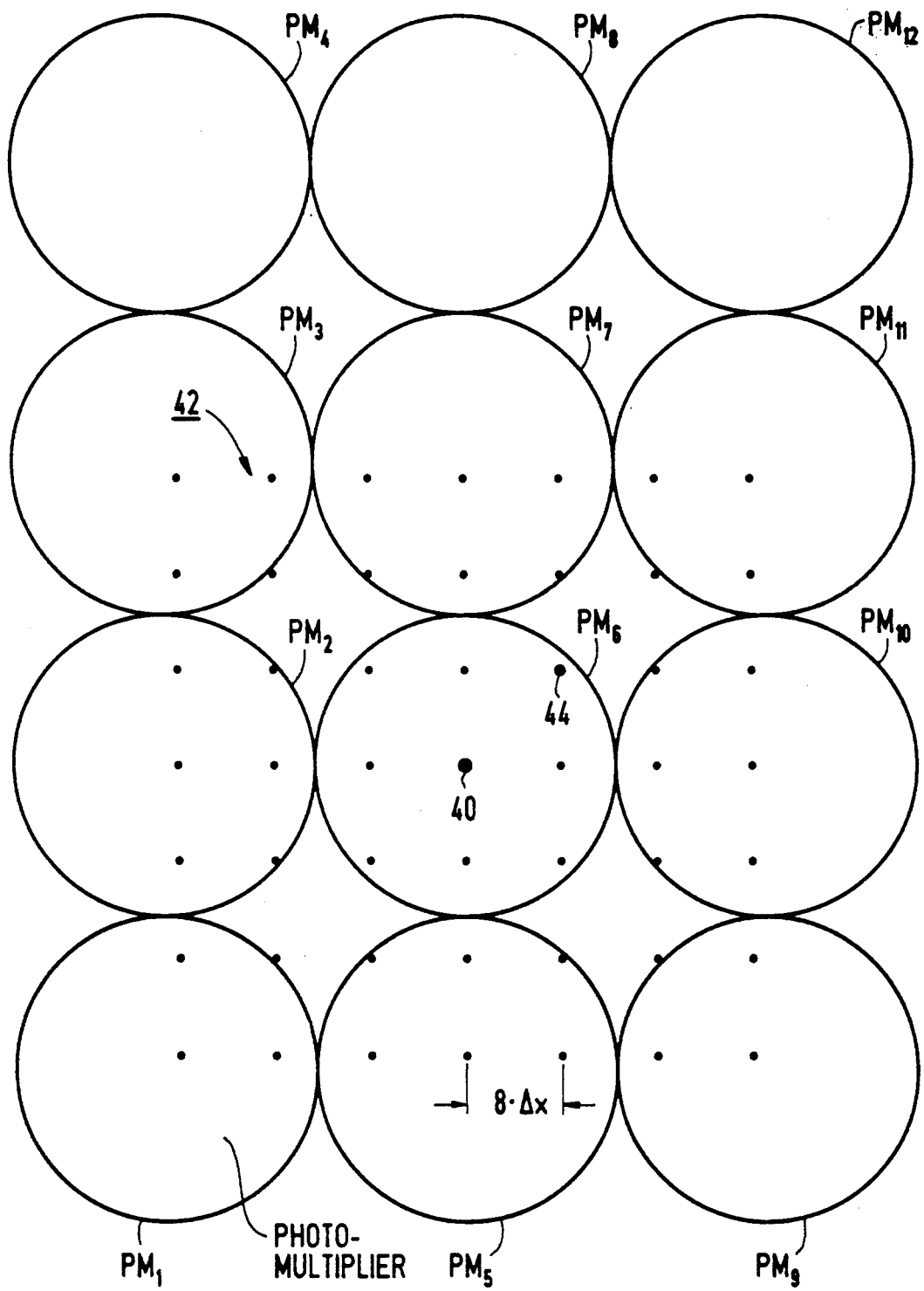
FIG. 3 illustrates the principle of a rough pre-localization, with subsequent localization of the maximum of the probability function in a coarse raster, in accordance with the principles of the present invention.
Figure 4:
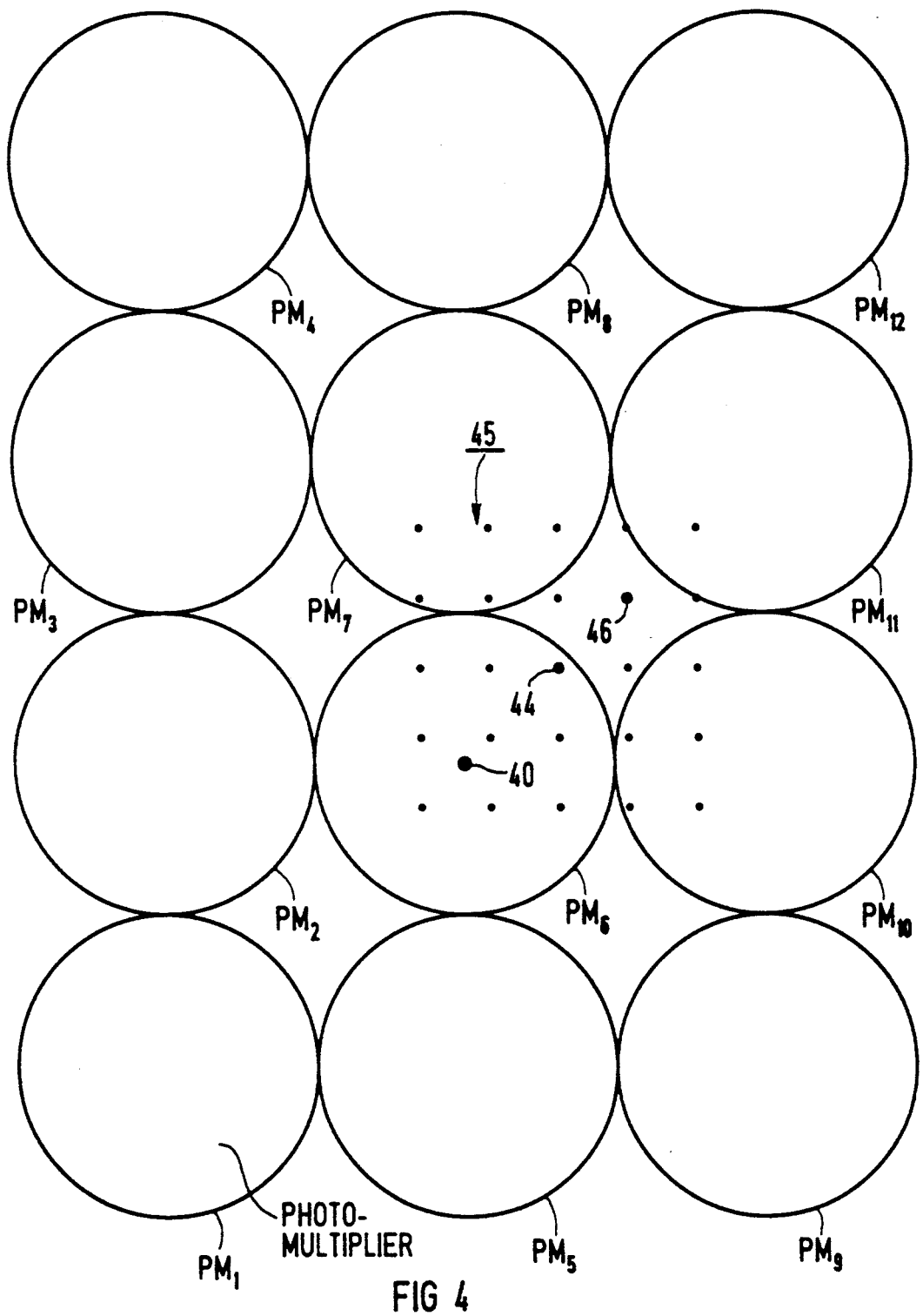
FIG. 4 illustrates a further step for the localization in a finer raster, in accordance with the principles of the present invention.
Figure 5:
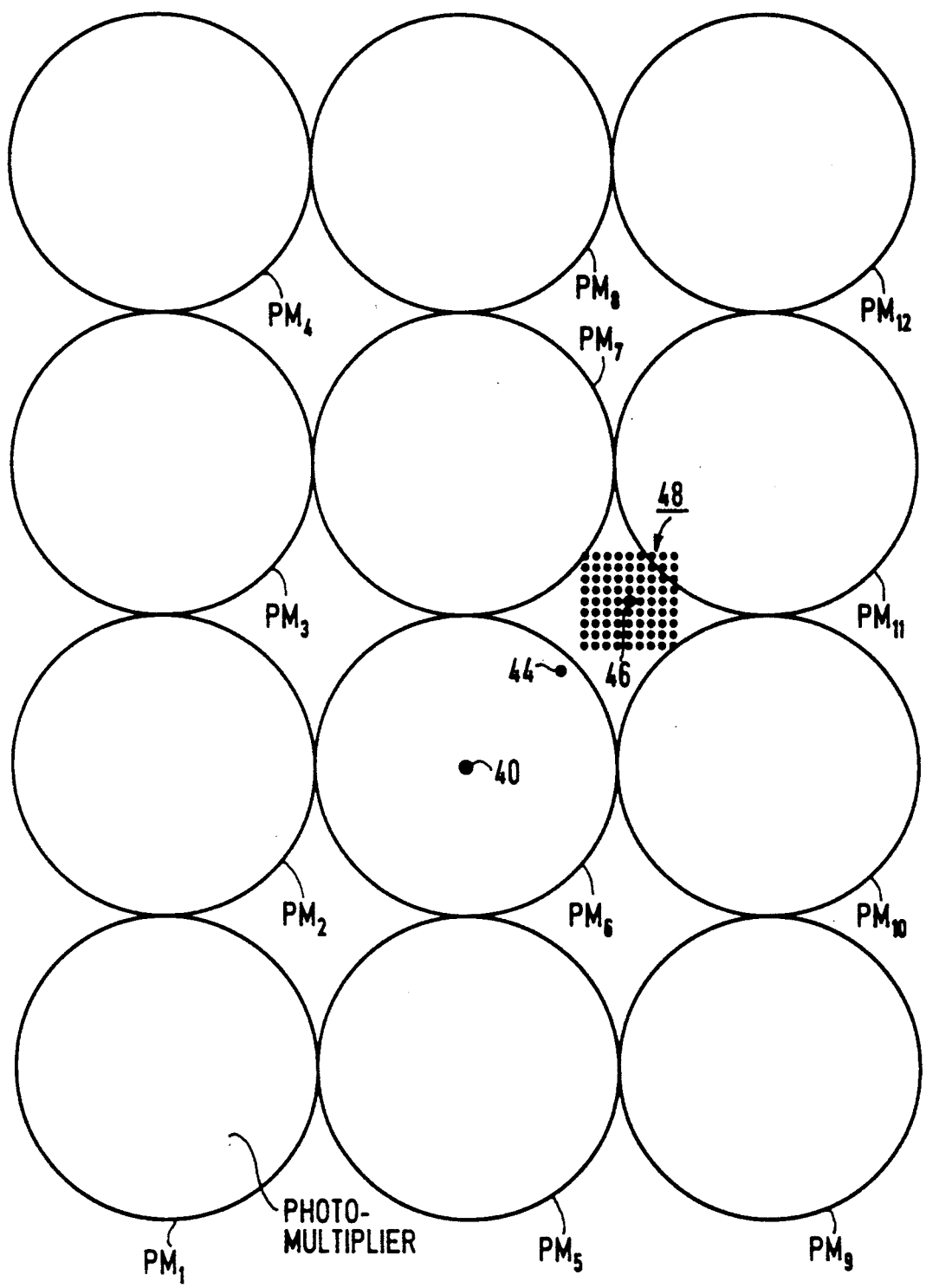
FIG. 5 illustrates a last step for the localization in a raster which corresponds to the spacing of comparative scintillation events, in accordance with the principles of the present invention.

With the aid of FIGS. 3 to 5, the principle of the coarse and fine localization is first explained. In the coarse localization one proceeds from the center of the photomultiplier $PM_i$ whose output signal $S_i$ is greatest. In FIG. 1 that would be the middle photomultiplier. This rough localization is regarded as the zero-th approximation of the absorption locus. In FIG. 3 there is now shown a schematic view of the measuring head 2 of a gamma camera with photomultipliers $PM_1$ to $PM_{12}$. The localization process described herein is independent of the actual number of photomultipliers in the camera surface. It is assumed that the photomultiplier $PM_6$ delivers the greatest output signal as a consequence of a scintillation event in the crystal 12 (not represented in FIG. 3). The canter 40 of the photomultiplier $PM_6$ is used as a rough localization or zero-th approximation of the absorption locus. Around this rough locus 40 there is now laid a rough raster of scanning points 42 with a mesh width of, for example, $8 \times \Delta \times$, in which $\Delta \times$ is the spacing of the comparative scintillation events. The raster points lie in a square matrix, the center of which coincides with the center 40 of the photomultiplier $PM_6$. The side length of the raster amounts approximately to twice the diameter of the photomultiplier PM. In a first step the values are calculated of the probability function for each raster point 42 of the coarse raster. The maximal value of the probability function is now used as a first approximation 44 for the absorption locus.

Around the absorption locus 44 found in the first approximation a refined raster 45 is then laid with a mesh width of, for example, $6 \times \Delta \times$, and further analogously to the first step a second approximation value 46 is determined of FIG. 4. Again, the absorption locus 44 found in the first approximation is the center of the square raster 45.

The last step for the localization of the scintillation event is represented in FIG. 5. With the locus 46 as the center, a fine, square raster with a mesh width of $\Delta \times$. This yields the final scintillation locus. With the raster spacings chosen in FIGS. 3 to 5 the raster points of the individual steps never coincide.

With this first localization process the number of raster points in the first step is 7×7 and in the second and third step is 5×5. The localization thus can be carried out with 100 calculations of the likelihood function and is, accordingly, with the same hardware, 100 times faster than in the case of a complete search over all the scanning points in example 1. A further advantage of this process is that employing this strategy with an enlargement of the camera surface, as in example 2, the number of scanning points at which the likelihood function is to be calculated is not further increased.

Figure 6:
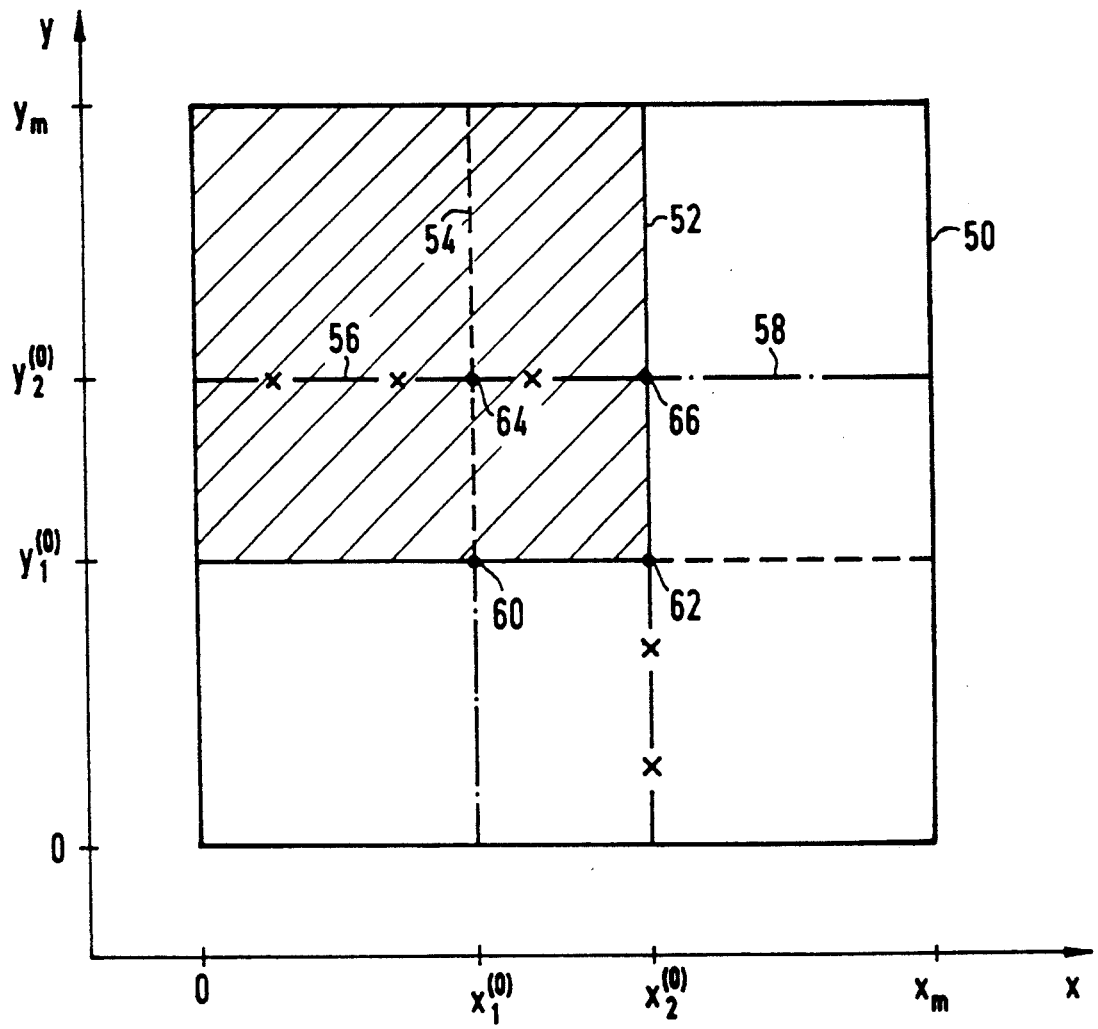
FIG. 6 illustrates a localization process by formation of overlapping partial surfaces according to the golden section, in accordance with the principles of the present invention.

The second localization strategy will be explained with the aid of FIG. 6, and is based on a division of the intervals within which the maximum is sought, according to the golden section. The camera surface is represented in FIG. 6 by a square 50, the sides of which in a rectangular coordinate system extend from 0 to $x_m$ and 0 to $y_m$, respectively. The camera surface 50 is subdivided into partial areas 52, 54, 56 and 58, which overlap. The side lengths of the partial surfaces 52, 54, 56 and 58 arise from the side length of the original side surface 50 by division according to the golden section. This means in FIG. 6 that the distance from 0 to $x_2$ is the geometric mean of the distance from 0 to $x_m$ and the distance from $x_2$ to $x_m$, i.e., $x_2/x_m = (x_m - x_2)/x_2$. The same is true for the distance $x_1$ to $x_m$.

Within each partial surface 52, 54, 56 and 58 the likelihood function is now determined at one locus. In the division according to the golden section the likelihood function at point 60 is calculated with the coordinates $(x_1, y_1)$, at point 62 with the coordinates $(x_2, y_1)$, at point 64 with the coordinates $(x_1, y_2)$ and at point 66 with the coordinates $(x_2, y_2)$. The division interval in which the greatest value of the likelihood function lies is now further subdivided and examined. This partial surface now divided according to the same scheme again into overlapping partial surfaces, in which again the greatest value of the likelihood function is determined to lie at one location. The further subdivision is stopped when the side lengths of the partial areas correspond to the spacing of the comparative scintillation events.

In each division step according to the golden section, the search interval is shortened to 62% of the preceding length. In the present two-dimensional case, therefore, the surface content in each step is reduced to about 38% of the original surface content. The number of required search steps is equal to the number of divisions that are necessary until the total surface of the camera is reduced to the pixel area, i.e., the side of a partial surface is equal to the spacing of the comparative scintillation events. If this second version of the process is applied to the aforementioned first example, ten search steps are needed, while with the second example eleven search steps are required. For the first example, therefore, the localization time is shortened by a factor of 1000 with respect to the direct process. Further it can be seen that the necessary number of steps increases only minimally with increasing camera surface.

Although modifications and changes may be suggested by those skilled in the art, it is the intention of the inventors to embody within the patent warranted hereon all changes and modifications as reasonably and properly come within the scope of their contribution to the art.

We claim as our invention:

1. In a process for localizing a scintillation event in a gamma camera having a plurality of photomultipliers forming a camera surface, each photomultiplier generating an output signal in response to said scintillation event, said process including the steps of generating a plurality of comparative signal sets from output signals of said photomultipliers corresponding to respective scintillation events of known locations, forming a location-dependent probability function based on a comparison of outputs of said photomultipliers for a scintillation event of unknown location with said comparative signal sets, said probability function having a maximum, and defining the location of said scintillation event of unknown location as the location corresponding to said maximum of said location-dependent probability function, the improvement comprising:

initially undertaking a pre-localization by defining a part of said camera surface, in which a high probability exists that the location of said scintillation event of unknown location lies, as a partial camera surface; and limiting the forming of said location-dependent probability function to locations within said partial camera surface.

2. The improvement of claim 1 wherein each of said photomultipliers has an observation surface uniquely associated therewith within said camera surface, and wherein the step of defining a part of said camera surface as a partial camera surface is further defined by defining the observation surface of a photomultiplier having the largest output signal as said partial camera surface.

3. The improvement of claim 1 wherein each of said photomultipliers has an observation surface uniquely associated therewith within said camera surface, each observation surface having a center and a diameter, and wherein the step of defining a part of said camera surface as said partial camera surface is further defined by defining a square as said partial camera surface, said square having a center coinciding with the center of the observation surface of a photomultiplier having the largest output signal, and said square having a side length which is substantially twice said diameter.

4. The improvement of claim 1 wherein the step of initially undertaking a prelocalization is further defined by the steps of:

dividing said partial camera surface into a first raster having coarse divisions and having a plurality of first raster points, one of said first raster points having a location at which said location-dependent probability function has a greatest value within said first raster;

defining a further partial camera surface, centered on said one of said first raster points and being smaller than said partial camera surface;

dividing said further partial camera surface into a second raster having divisions finer than the divisions of said first raster and having a plurality of further raster points; and limiting the forming of said location-dependent probability function to locations within said further partial camera surface.

5. The improvement of claim 4 wherein none of said points within said first raster coincide with any of said points within said second raster.

6. The improvement of claim 4 wherein said scintillation events of known location used to generate said plurality of comparative signal sets are spaced from one another by a pixel distance, and said improvement comprising the additional step of:

successively defining a plurality of further partial camera surfaces, each being smaller than an immediately preceding further partial camera surface and each being divided into a raster of increasingly finer divisions, until a distance between raster points in one of said plurality of further partial camera surfaces equals said pixel distance.

7. The improvement of claim 6 wherein none of said raster points in any of said partial camera surface and said further partial camera surfaces coincide.

8. The improvement of claim 6 wherein said raster points of said first raster are spaced from one another at distances equal to eight times said pixel distance and wherein said raster points of said second raster are spaced from one another at distances equal to six times said pixel distance.

9. The improvement of claim 1 wherein the steps of generating said plurality of comparative signal sets and forming a location-dependent probability function are respectively further defined by:

generating said plurality of comparative signal sets from the standard deviations of said output signals of said photomultipliers corresponding to said respective scintillation events of known locations; and forming said location-dependent probability function as a Gaussian distribution function of said standard deviations.

10. In a process for localizing a scintillation event in a gamma camera having a plurality of photomultipliers forming a camera surface, each photomultiplier generating an output signal in response to said scintillation event, said process including the steps of generating a plurality of comparative signal sets from output signals of said photomultipliers corresponding to respective scintillation events of known locations, spaced from one another at a pixel distance, forming a location-dependent probability function based on a comparison of outputs of said photomultipliers for a scintillation event of unknown location with said comparative signal sets, said probability function having a maximum, and defining the location of said scintillation event of unknown location as the location corresponding to said maximum of said location-dependent probability function, the improvement comprising:

dividing said camera surface into a plurality of overlapping partial camera surfaces;

identifying a point within each partial camera surface at which said location-dependent probability function has a maximum within that partial camera surface;

identifying one of said partial camera surfaces in which said location probability function has a largest value;

dividing said partial camera surface in which said location-dependent probability function has a largest value into overlapping further partial camera surfaces and identifying a further partial camera surface in which said location-dependent probability function has a largest value;

successively dividing said further partial camera surface in which said location-dependent probability function has a largest value into a plurality of further, increasingly smaller, overlapping partial camera surfaces and successsively identifying one of said further partial camera surfaces in which said location-dependent probability function has a largest value until a further partial surface is reached having a size equal to said pixel distance; and defining the location of said scintillation event of unknown location as being within said further partial camera surface having said size equal to said pixel distance.

11. The improvement of claim 10 wherein each of said partial camera surfaces and said further partial camera surfaces are rectangular, and wherein the steps of defining said overlapping further partial camera surfaces are further defined by dividing each immediately preceding partial camera surface or further partial camera surface into four overlapping further partial camera surfaces and thereby defining four points respectively corresponding to the intersections of the sides of said four overlapping partial camera surfaces; and determining said location-dependent probability function at each of said intersection points.

12. The improvement of claim 11 wherein the step of dividing said partial camera surface of said further partial camera surfaces into four overlapping partial camera surfaces is further defined by dividing said partial camera surface or said further partial camera surfaces into four overlapping partial camera surfaces by division according to the golden section.

13. The improvement of claim 10 wherein the steps of generating said plurality of comparative signal sets and forming a location-dependent probability function are respectively further defined by:

generating said plurality of comparative signal sets from the standard deviations of said output signals of said photomultipliers corresponding to said respective scintillation events of known locations spaced from one another at said pixel distance; and forming said location-dependent probability function as a Gaussian distribution function of said standard deviations.

* * * * *